May 13, 1952  L. H. FLORA ET AL  2,596,332
ROTARY ATTACHED FASTENER FOR SECURING OBJECTS TO PANELS
Filed July 19, 1948  2 SHEETS—SHEET 1
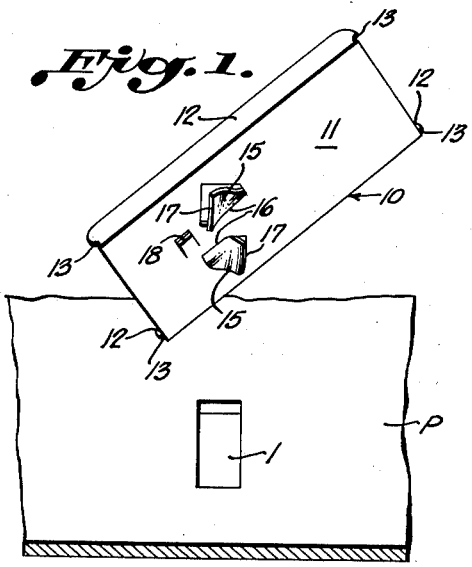
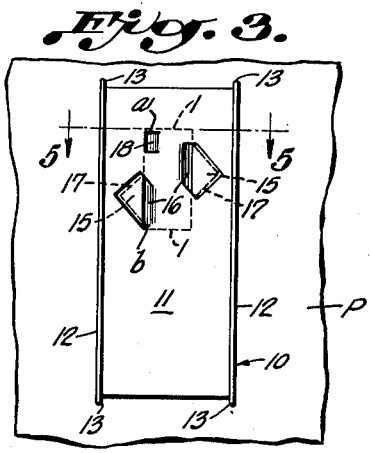
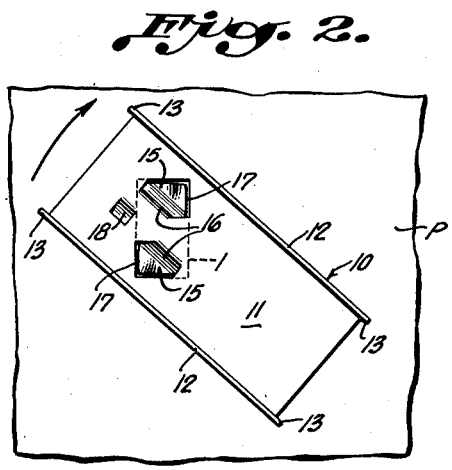
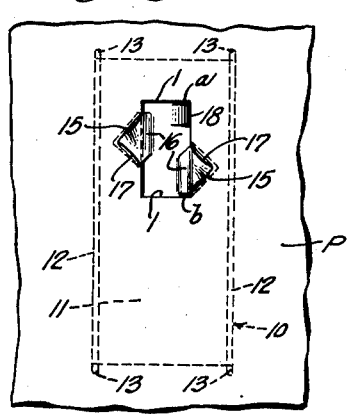
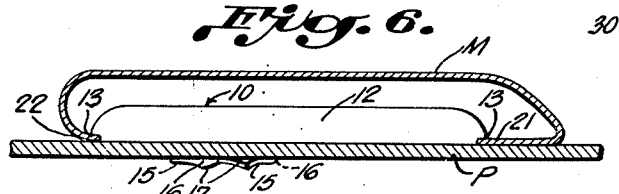
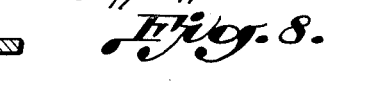
INVENTORS
LAURENCE H. FLORA
CHARLES A. KELLEY
BY
H. G. Lombard
ATTORNEY

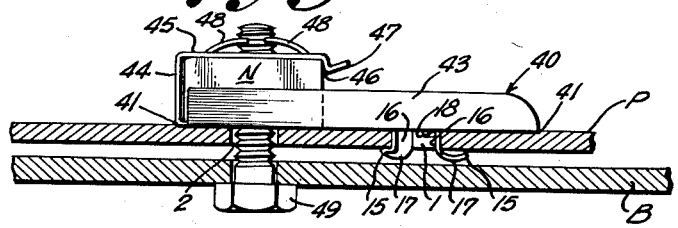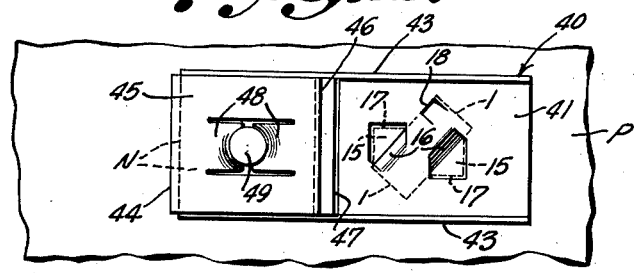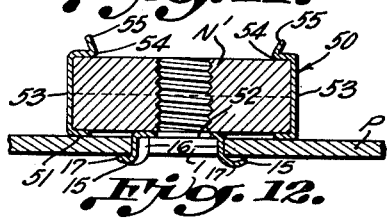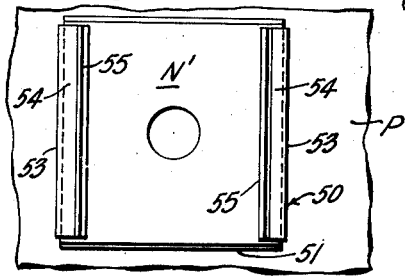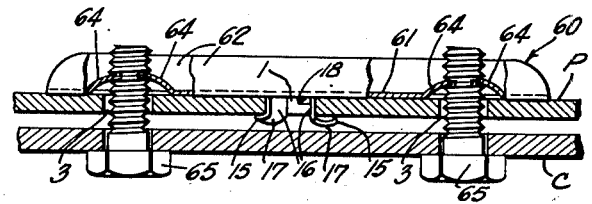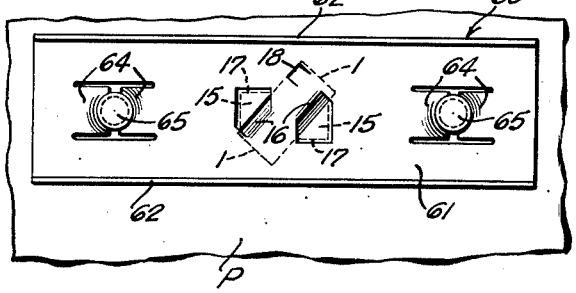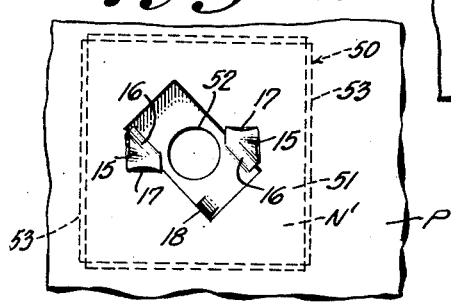
INVENTORS
LAURENCE H. FLORA
CHARLES A. KELLEY
BY
ATTORNEY Patented May 13, 1952

2,596,332

UNITED STATES PATENT OFFICE 2,596,332

ROTARY ATTACHED FASTENER FOR SECURING OBJECTS TO PANELS

Laurence H. Flora and Charles A. Kelley, Cleveland, Ohio, assignors to Tinnerman Products, Inc., Cleveland, Ohio, a corporation of Ohio Application July 19, 1948, Serial No. 39,484

2 Claims. (Cl. 24—73)

This invention relates in general to attachable types of fastening devices which are designed for ready attachment to an apertured supporting part to provide the same with means for securing a cooperating part thereto or for securing another structure, object or article of manufacture to said supporting part. The invention is directed, more particularly, to fasteners of this kind which comprise a clip type attaching means that is secured in an opening in a supporting part by a turning or rotary motion.

A primary object of the invention is to provide various forms of such fasteners in which the attaching means comprises an improved simplified construction that is particularly suited for easy and quick application to a relatively small, simple assembling slot in a supporting part and in a manner whereby the fastener is positively locked in applied position against possible displacement or loosening under the most severe conditions of vibration, shock, or the like.

A further object of the invention is to provide various fasteners of this character having an improved attaching means that is designed for ready application to locked position in a simple generally rectangular assembling opening in a supporting part and covers and closes the assembling opening against the passage of dust, moisture and other foreign matter.

Another object of the invention is to provide various fasteners of the kind described in which the improved attaching means includes a pronounced locking element adapted to lock the fastener positively in attached position against reverse turning, shifting or displacement.

Further objects and advantages and new and useful features in the construction, arrangement and general combination of parts of the various forms of the invention will be apparent as the following description proceeds with reference to the accompanying drawings, for purposes of illustration but not of limitation, in which like reference characters designate like parts throughout, and in which:

Fig. 1 is a perspective view of a fastener for mounting a molding or the like showing the fastener from the underside thereof as prepared with attaching means in accordance with the invention and in position to be attached in an assembling opening in a supporting part, represented in section;

Fig. 2 is a plan view showing the molding fastener of Fig. 1 as initially applied in the assembling opening in the supporting part;

Fig. 3 is a similar view showing the fastener as rotated to fully attached position in the assembling opening in the supporting part;

Fig. 4 is a bottom plan view of Fig. 3 showing the attaching elements of the fastener in final position in the assembling opening in the supporting part;

Fig. 5 is a sectional view of Fig. 3 along line 5—5, looking in the direction of the arrows; and, Fig. 6 is a sectional view of a completed installation of a molding as mounted by the fastener attached to the supporting part as shown in Figs. 3 to 5 inclusive.

Fig. 7 illustrates another molding installation embodying a modified form of fastener provided with attaching means similar to the fastener of Figs. 1 to 6 inclusive.

Fig. 8 shows another form of the invention in which the fastener comprises attaching means similar to the fastener of Figs. 1 to 6 inclusive and serves to retain a wire, cable, tube, rod, or other article of manufacture.

Fig. 9 is a sectional view illustrating a further embodiment of the invention in which the fastener is provided with attaching means similar to the fastener of Figs. 1 to 6 inclusive in a form of nut holder which includes means for providing a thread locking action on the bolt applied to the nut; and, Fig. 10 is a top plan view of Fig. 9.

Fig. 11 is a sectional view showing another fastener in accordance with the invention as provided in the form of a nut holder which is attached in the same opening through which the bolt is applied to the nut;

Fig. 12 is a top plan view of Fig. 11; and

Fig. 13 is a bottom plan view of Fig. 11 showing the attaching means of the nut holder as provided in association with a passage for the bolt to be applied to the nut.

Fig. 14 is a sectional view showing another fastener in the form of a multiple nut device as attached to a supporting part, parts of the fastener being broken away to illustrate the construction of the thread engaging portions of the fastener; and Fig. 15 is a top plan view of Fig. 14.

Referring now more particularly to Figs. 1–6 inclusive of the drawings, it will be understood that the molding installation illustrated in Fig. 6 is one of the general character in which a trim strip, beading, or the like finishing object may be mounted onto a supporting part by an operation taking place entirely from the forward or readily accessible side thereof. The invention, therefore, is particularly suited for use in installations involving a blind location in which the rearward side of the supporting structure is not conveniently or readily accessible for attaching a retainer used in the mounting of a molding or other object onto the supporting structure.

The retainers are provided in the manner of substantial clip devices comprising an attaching means and article holding means, the attaching means of the retainer being adapted to be easily and quickly applied to substantially locked fastening position on the supporting structure from the forward side thereof, whereupon the molding or other object may then be applied to the holding means of the retainer in fully mounted position on the supporting structure by an operation likewise taking place from the forward side thereof. Thus there is no necessity for access to the rearward side of the supporting structure as in arrangements in which the retainers are attached by bolt and nut fastenings required to be secured together from both sides of the supporting structure.

The fastener or retainer 10 is constructed most economically from a suitable blank of sheet metal best provided in the manner of a simple, rectangular section severed from standard strip stock with minimum loss or waste of material. Any suitable sheet metal may be employed such as spring steel or cold rolled steel having spring characteristics. The approximate mid-portion of the blank defines the fastener base 11 and on either side thereof, there are provided upwardly bent arms 12 having cam shoulders 13 on the ends thereof onto which the side flanges of the molding or other finishing object are adapted to be sprung to mounted position on the supporting structure, as shown in Fig. 6. The supporting structure, designated generally P, may be of any suitable material such as sheet metal, wood, fiber board, or the like; however, inasmuch as the instant invention is employed mainly in metallic structures, the supporting structure is usually in the form of a metallic panel or plate-like element.

As best seen in Fig. 1, in order to adapt the supporting structure P for use with a fastener or retainer 10, there is provided an assembling opening in the form of a simple rectangular slot 1. A suitable number of such openings are prepared for the required retainers to be used, the same being provided in predetermined spaced relation on the supporting structure along the path which the molding or other finishing object to be mounted by the fasteners extends in mounted position. In this form of the invention, the assembling openings 1 are elongated and arranged with their major dimensions extending transversely of the molding to be applied thereto.

The body of the retainer includes an attaching portion designed to hold the same in self-sustained position on the supporting structure preparatory to the application of the molding or other part thereto in mounting such part on the supporting structure entirely from the forward side thereof. Inasmuch as the fastener or retainer 10 is of the type which is turned or rotated to attached position, the attaching elements are provided in a novel arrangement at one end portion of the fastener so that the other end of the fastener body is usable as a lever to rotate the fastener to attached fastening position in a simple most expeditious manner. The attaching elements comprise a pair of similar cooperating cam hooks 15, having V-shaped extremities which are struck and formed from the fastener base 11 to project outwardly out of the plane of the underside thereof in generally parallel and spaced relation thereto. The cam hooks 15, are arranged in diagonal or offset relation to each other such that their V-shaped extremities define a generally rectangular area corresponding substantially to the contour of the generally rectangular assembling opening in the support so as to be readily received therein when the fastener is initially applied as shown in Fig. 2.

The cam hooks 15 are spaced from the fastener base 11 a distance slightly less than the thickness of the panel P and at their junctions to the fastener base define abutments 16 spaced apart a distance approximating the width of the assembling slot 1. The leading ends of the cam hooks 15 preferably are bent to define outwardly flared lips 17 which facilitate the initial engagement of the cam hooks with the marginal portions of the assembling opening when the fastener is initially applied. The cam hooks 15 otherwise are so arranged on the fastener body that the fastener, when rotated to final position, extends generally transversely to the length of the molding in a manner whereby the molding may be readily attached onto the shoulders 13 on the arms thereof.

A locking detent 18 preferably is provided in association with either or both of the cam hooks 15. The locking detent comprises a suitable lug element which is partially severed from the fastener base so that the free end defines a pronounced abutment which is spaced from the abutment 16 of the associated cam hook a distance approximating the width of the assembling opening 1 so as to engage the wall of the assembling opening to lock the fastener in attached position as shown in Figs. 3 and 4.

With the fastener 10 thus provided and the supporting structure prepared with the required assembling openings in the form of the generally rectangular slots 1 along the path of the molding in mounted position, the fasteners 10 are easily and quickly attached simply by inserting the cam hooks 15 of a fastener into the complementarily shaped assembling opening 1, and turning or rotating the fastener clockwise forty-five degrees in the direction of the arrow, Fig. 2. This is accomplished by pushing the end of the fastener body opposite the cam hooks 15 in the manner of a lever until the fastener is disposed in fully attached position shown in Fig. 3. The outwardly flared lips 17 on the extremities of the cam hooks 15 facilitate the initial engagement of the cam hooks with the marginal portions of the assembling opening 1, and as the fastener is rotated, said cam hooks have a pronounced camming, gripping action with the engaged marginal portions of the assembling opening while the locking detent 18 yields against the support as necessary to permit such turning of the fastener. In the fully attached position of the fastener, Figs. 3, 4 and 5, the abutments 16 on the cam hooks engage the side walls of the assembling opening in cooperation with the locking detent 18 which is received in the assembling opening with its free end in abutting engagement with the adjacent wall of the assembling opening. The abutments 16 and locking detent 18 thus maintain the fastener in final attached position against rotation in either direction inasmuch as the abutments 16 prevent further turning in the direction of application of the fastener while the locking detent 18 snaps into abutting engagement with the adjacent side wall of the assembling slot to prevent any reverse turning of the fastener toward loosening or removal of the cam hooks 15 from final position in the assembling opening. In addition, the arrangement is such that the fastener is also retained in attached position against displacement lengthwise of the assembling slot by the disposition of the outer edge a of the locking detent 18, Figs. 3 and 4, adjacent one end wall of the assembling slot 1 while the outer edge b of the opposite cam hook 15 is disposed adjacent the other end wall so that these elements serve as projections in abutting relation to the opposite end walls of the assembling slot for preventing shifting or sliding of the fastener in either direction lengthwise of said assembling slot. This arrangement in a rotary fastener for both locking the fastener in attached position against reverse rotation and for preventing shifting of the fastener lengthwise of the assembling slot is most important in that the fastener is secured in a fixed, rigid and positively locked attachment which is adapted to resist displacement in any direction under the most severe conditions of vibration, shock and the like.

By virtue of the specific formation of the cam hooks 15 in complementarily shaped relation to the rectangular assembling opening 1, said assembling opening may be most advantageously provided in a relatively small size, and which, in the final assembly of the fastener, not only is covered by the fastener base 11 but is tightly closed in the regions of said cam hooks so as to prevent the passage of water and dust therethrough. The instant fastener, therefore, is particularly beneficial in that it substantially seals the opening in which the fastener is attached in a completed assembly so as to prevent the entrance of any objectionable foreign matter to the interior of the assembly.

A suitable number of retainers or fasteners 10 are secured to the support P as shown in Figs. 3 and 6 along the path which the molding M extends in mounted position. The molding M may be of any selected cross section and is usually in the form of a channel-shape or beading which includes inturned flanges 21, 22 adapted to be sprung onto the fasteners 10 by snap fastening action with the shoulders 13 on the arms 12 thereof. The arrangement is such that when the molding is placed over the fasteners 10 and pressure exerted on the crown thereof, the edges of the flanges 21, 22 flex outwardly against the ends of the arms 12 as necessary for said flange edges to snap over and seat on the shoulders 13.

Fig. 7 shows an alternate molding construction in which the rotary fastener 25 is constructed similarly to the fastener described with reference to Figs. 1–6 inclusive to include attaching means in the form of cam hooks 15 and the locking detent 18. The means for mounting the molding M', however, comprise spring arms 26 formed from end portions of the fastener base 11 and designed for snap fastening action with the inturned flanges 27 on the molding. The said spring arms 26, extend longitudinally of the inturned flanges 27, and accordingly, when the molding is placed thereon and pressed downwardly, said spring arms 26 are caused to flex gradually inwardly toward each other until the flanges 27 of the molding pass over and firmly and rigidly engage the shoulders defined by said spring arms. This assembly otherwise is preferably provided for in the manner of a substantial snap fastening engagement by which the molding or other trim material is easily and quickly secured to the retainers in fully mounted position on the supporting structure in a minimum of time and effort.

Fig. 8 illustrates a further embodiment of the invention comprising a fastener 30 in the form of a clip for mounting a rod, tube, cable or other article of manufacture. The fastener includes a base 31 from which are stamped the cam hooks 15 and the locking detent 18 for attachment in an assembling opening 1 in the support similarly to the fastener of Figs. 1–6 inclusive. The fastener includes an extension on either end of the fastener base 31 which is bent in the form of a spring arm 33 to accommodate the article to be mounted such as, for example, the wire W, as shown. Preferably, the spring arm 33 is provided with an outwardly flared extremity 34 which is adapted to facilitate the outward flexing of said spring arm as necessary to pass the wire W or other article to be secured by said spring arm.

Figs. 9 and 10 show the invention in the form of a nut holder comprising a fastener 40 provided with attaching means which are similar in construction and application to the attaching means described with reference to the fastener of Figs. 1–6 inclusive. The nut holder 40 comprises a base 41 provided with the similar struck out cam hooks 15 and the locking detent 18 together with upstanding side arms 43 defining spaced side walls engaging opposite faces of a nut N. The nut N overlies a bolt passage in the fastener base and is arranged to be aligned with a bolt opening 2 in the panel P upon rotation of the nut holder to attached position. An extension on the fastener base is bent to define an end wall 44 and a spring arm 45 overlying the top of the nut which is formed with a shoulder 46 and an outwardly flared lip 47 that facilitates assembly of the nut under said spring arm. Preferably the spring arm 45 is provided with integral thread engaging means in the form of cooperating resilient tongues 48 or the like adapted to provide a thread locking action on the bolt 49 threaded into the nut. The nut N, accordingly, is retained in assembled relation with the nut holder against relative rotation by the side walls 43 engaging a pair of opposing faces of the nut in cooperation with the end wall 44 and shoulder 46 engaging another pair of opposing faces thereof while the spring arm 45 engages the top of the nut.

The nut may be assembled with the nut holder 40 either prior to or after the nut holder is attached to the support P by rotation of the cam hooks 15 in the assembling opening 1, as in the previously described forms of the invention. Such rotation of the fastener to attached position disposes the nut carrying portion of the nut holder in aligned relation with the bolt passage 2 in the support in final position to receive the bolt 49 for securing a part B to the support P in a completed installation.

Figs. 11–13 inclusive illustrate another design of the fastener in the form of a nut holder for attaching a nut N' over the assembling opening 1 in the supporting panel P in an arrangement whereby said assembling opening serves also as the passage or the bolt to be applied to the nut N'. The fastener 50 comprises a base 51 having a bolt passage 52 and the cam hooks 15 provided on opposite sides of said bolt passage together with a locking detent 18 for attaching the fastener in the assembling opening 1 similarly to the fastener described with reference to Figs. 1–6 inclusive. On the fastener base 51 thus provided, end portions are bent upwardly to define a pair of cooperating spring arms 53 for engaging opposing faces of the nut N'. Preferably said spring arms are designed for snap fastening engagement with the nut and, to this end, the extremities thereof are bent into the form of inwardly extending shoulder 54 terminating in outwardly flared lips 55 which facilitate application of the nut between said spring arms to assembled relation with the nut holder. Engagement of the nut with the outwardly flared lips 55 on the spring arms spreads the same as necessary to permit the nut to be received therebetween with the shoulders 54 engaging the top of the nut to retain the same in assembled relation with the nut holder while the spring arms 53 engage opposing faces of the nut to hold the same against relative rotation. The nut is assembled with the nut holder either prior to or after the nut holder is attached in the assembling opening 1 in the supporting panel P. In any case, the nut N' as assembled with the nut holder has the threaded opening therein aligned with the bolt passage 52 in the base of the nut holder and in alignment with the assembling opening 1, whereupon the bolt which is applied to the nut is readily passed through these aligned openings into threaded engagement with the nut to secure the parts of an installation.

Figs. 14 and 15 show another embodiment of the invention in which the fastener comprises a one-piece multiple nut device together with means for attaching the device in fastening position on the supporting part P in the manner described with reference to the fastener of Figs. 1–6 inclusive. The fastener 60 comprises, similarly, a base 61 having side arms 62 and attaching elements in the form of the cam hooks 15 and the locking detent 18 stamped from said fastener base. On either side of said attaching elements 15, there are provided on the fastener base 61 integral thread engaging means such as cooperating tongues 64 for threadedly engaging a bolt or screw in the manner of a nut. The thread portions 64 have a spacing corresponding to the spacing of bolt passages 3 in the support and accordingly, are adapted to be aligned with said bolt passages when the fastener is attached in final position by rotation of the cam hooks 15 in the assembling opening 1. The bolts 65 thereupon may be readily passed through the passages 3 into threaded engagement with the thread portions 64 on the fastener to secure a part C to the supporting part P in a completed installation.

The fastener in any form preferably is constructed of relatively thin sheet metal, the thickness of which is selected according to service requirements and the predetermined size of the parts secured. The fasteners are most effective when provided of spring metal suitably spring tempered and otherwise treated to give the desired toughness and hardness, particularly in the case of devices which are used in installations where extreme vibratory motion takes place. A cheap and highly effective fastener may be provided from cold rolled metal, such as cold rolled steel, which is untempered but of a spring metal nature and capable of providing an effective and reliable fastening means.

While the invention has been described in detail with specific examples, such examples are intended as illustrations only inasmuch as changes in the construction and arrangement of the fasteners within the broad scope of the instant disclosure are fully contemplated.

What is claimed is:

1. A fastener comprising a sheet metal base having a pair of cooperating attaching hooks provided from the material of said base and projecting from the underside of said base, said hooks extending in opposite directions in longitudinal relation to each other and having spaced transverse junctions with said base which are laterally offset and separated by a transverse space directly between said transverse junctions, a projection at the underside of said fastener base located substantially opposite the transverse junction of one of said hooks and to the side of the other hook, and means carried by said fastener base for engaging an object to be fastened.

2. A fastener comprising a sheet metal base having a pair of cooperating attaching hooks provided from the material of said base and projecting from the underside of said base, said hooks extending in opposite directions in longitudinal relation to each other and having spaced transverse junctions with said base which are laterally offset and separated by a transverse space directly between said transverse junctions, a projection at the underside of said fastener base located substantially opposite the transverse junction of one of said hooks and to the side of the other hook, and a pair of arms bent upwardly from said fastener base, said arms having shoulders provided on the edges at the ends of said arms for snap fastening engagement with the flanges of a channel shaped object such as a molding, or the like.

LAURENCE H. FLORA.
CHARLES A. KELLEY.

REFERENCES CITED

The following references are of record in the file of this patent:

UNITED STATES PATENTS

| Number | Name | Date |
| --- | --- | --- |
| 890,285 | Krantz | June 9, 1908 |
| 2,080,769 | Fitts | May 18, 1937 |
| 2,140,887 | Tinnerman | Dec. 20, 1938 |
| 2,144,171 | Van Uum | Jan. 17, 1939 |
| 2,168,721 | Tinnerman | Aug. 8, 1939 |
| 2,187,322 | Jones | Jan. 16, 1940 |
| 2,306,975 | Pender | Dec. 29, 1942 |
| 2,318,840 | Del Camp | May 11, 1943 |
| 2,353,583 | Place | July 11, 1944 |
| 2,355,485 | Tinnerman | Aug. 8, 1944 |